(12) United States Patent
Voigt et al.

(10) Patent No.: US 7,300,343 B2
(45) Date of Patent: Nov. 27, 2007

(54) DEVICE AND METHOD FOR INTRODUCING LIQUIDS INTO MEAT

(75) Inventors: Roland Voigt, Schmalkalden/Thüringen (DE); Konrad Erbe, Seeba/Thüringen (DE)

(73) Assignee: Feina GmbH, Schmalkalden/Thüringen (DE)

( * ) Notice: Subject to any disclaimer, the term of this patent is extended or adjusted under 35 U.S.C. 154(b) by 77 days.

(21) Appl. No.: 10/539,989

(22) PCT Filed: Dec. 12, 2003

(86) PCT No.: PCT/DE03/04105

§ 371 (c)(1),
(2), (4) Date: Jun. 17, 2005

(87) PCT Pub. No.: WO2004/054373

PCT Pub. Date: Jul. 1, 2004

(65) Prior Publication Data

US 2006/0264164 A1 Nov. 23, 2006

(30) Foreign Application Priority Data

Dec. 17, 2002 (DE) .............................. 102 58 905

(51) Int. Cl.
*A22C 9/00* (2006.01)
(52) U.S. Cl. ...................................................... 452/171
(58) Field of Classification Search ........ 452/141–147; 99/532, 533, 485, 487, 489
See application file for complete search history.

(56) References Cited

U.S. PATENT DOCUMENTS 3,436,230 A  4/1969 Harrington 3,916,777 A * 11/1975 Earl ............................ 99/533

(Continued)

FOREIGN PATENT DOCUMENTS

DE           2857677           12/1980

(Continued)

*Primary Examiner*—Thomas Price
(74) *Attorney, Agent, or Firm*—Collard & Roe, P.C.

(57) ABSTRACT

Disclosed is a device and a method for introducing liquids into meat containing bones and/or cartilage or connective tissue, e.g. in the slaughtered body of poultry as well as in legs and belly meat, in order to treat, season, and/or preserve said meat. The aim of the invention is to create a device and a method which make it possible to simultaneously introduce exactly defined, even very small quantities of water, brine, preservatives, seasoning liquids, and/or other liquids in a manner that is adapted to the anatomy of the body of the slaughtered animal, even into meat containing bones and/or cartilage or connective tissue, within a very short period of time on almost any conveying unit, even an existing one, and even on a slaughtering conveyor belt, without using any needle while being highly effective and highly reliable, having a robust structure, and providing minimal tolerance of the injected quantity. Said aim is achieved by a device for introducing liquids into meat, comprising a base frame (1). Said device is characterized by the fact that one or several machine frame/s (3) is/are arranged in a rigid manner or so as to he movable in a linear direction on the base frame (1) while one/several injection device/s (6) which is/are used for needle-free injection and is/are connected to one/several high pressure unit/s (4) via one/several liquid distribution system/s (5) is/are disposed on the machine frame/s (3), each injection device (6) comprising one or several nozzle pipe/s (7) on which one or several spray nozzle/s (8) is/are arranged and which is/are disposed on the machine frame (3) so as to be deliverable. The inventive method is characterized by the fact that each of the nozzle pipes (7) as well as one/several spray lance/s (6) can he separately impinged upon by an identical and/or different, precisely defined pressure that is applied to different liquids for identical and/or different, exactly defined periods of time.

15 Claims, 4 Drawing Sheets

U.S. PATENT DOCUMENTS

Figure 1:
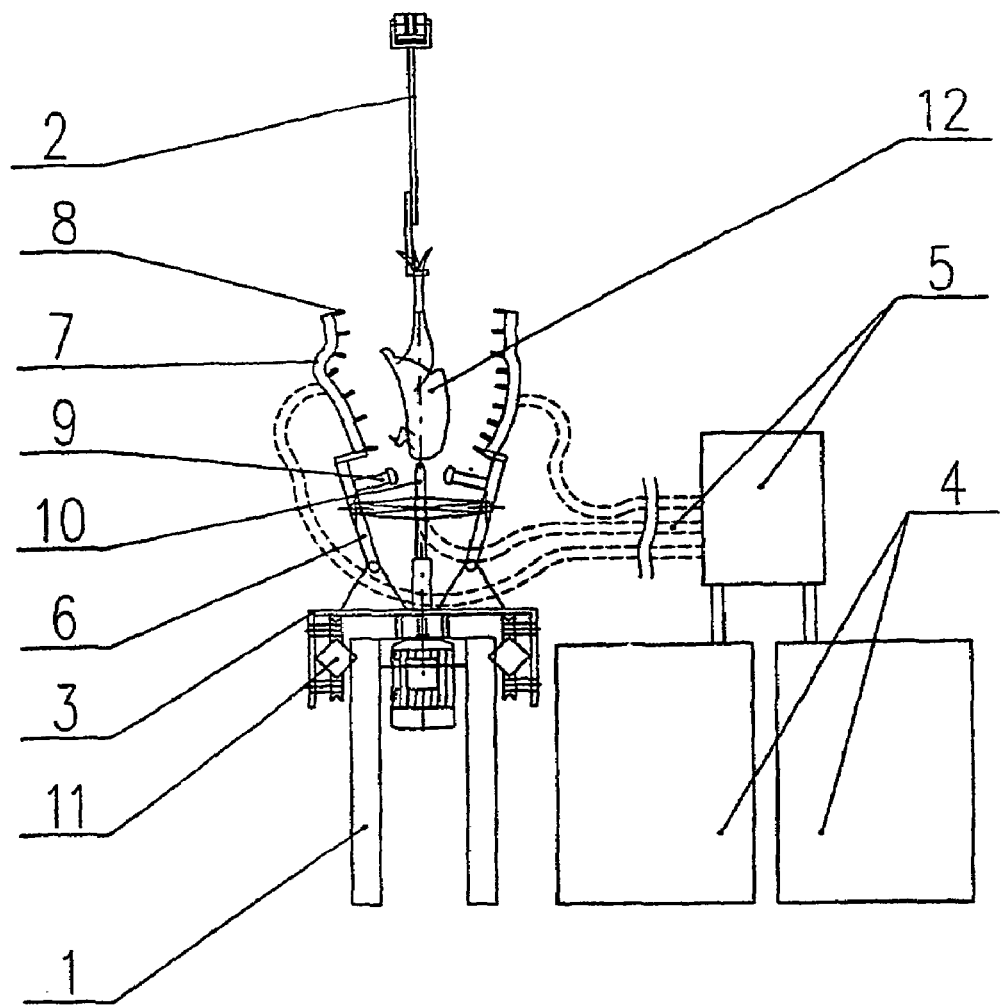

| | | | |
|---|---|---|---|
| 3,965,536 A * | 6/1976 | Osiadacz et al. | 99/533 |
| 4,074,389 A * | 2/1978 | Blair et al. | 99/533 |
| 4,411,047 A * | 10/1983 | Norton | 426/58 |
| 5,071,666 A | 12/1991 | Handel | |
| 5,176,071 A | 1/1993 | Klaassen | |
| 5,449,524 A | 9/1995 | Ludwig | |
| 5,664,488 A * | 9/1997 | Smith | 99/487 |
| 6,014,926 A | 1/2000 | Suzuki | |
| 6,658,990 B1 * | 12/2003 | Henning et al. | 99/352 |
| 6,955,830 B2 * | 10/2005 | Townsend | 426/281 |

FOREIGN PATENT DOCUMENTS

| | | |
|---|---|---|
| DE | 3209730 | 9/1983 |
| DE | 198 25 233 | 12/1999 |
| EP | 1 240 827 | 9/2002 |
| WO | WO 00/32051 | 6/2000 |

* cited by examiner

DEVICE AND METHOD FOR INTRODUCING LIQUIDS INTO MEAT

CROSS REFERENCE TO RELATED APPLICATIONS

Applicants claim priority under 35 U.S.C. §119 of German Application No. 102 58 905.4 filed on Dec. 17, 2002. Applicants also claim priority under 35 U.S.C. §365 of PCT/DE2003/004105 filed on Dec. 12, 2003. The international application under PCT article 21 (2) was not published in English.

The invention relates to a device and a method for introducing liquids into meat containing bones and/or cartilage or connective tissue, such as, for example, into the slaughtered bodies of poultry, but also into legs or, for example, belly meat, in order to treat, season and/or preserve said meat.

In the state of the art, a device for injecting liquid into pieces of meat is described in DE 28 57 677 C 2. In the case of this device, the pieces of meat are penetrated by means of injection needles, and are pressed together by means of a hold-down device. The residual height of the hold-down device determines the injection amount, in each instance.

As one can imagine, this device is unsuitable for use in the case of meat from slaughtered animal bodies that contains bones. On the one hand, the pieces of meat are severely damaged by the injection needles. On the other hand, when the needles are pressed into the meat that contains bones, bone splintering, breakage of the needles, or clogging of the needles can occur when the needles are pressed into the meat. Furthermore, as one can imagine, this device is also unsuitable for meat that contains bones and has cavities, such as chicken, since either the liquid to be injected is sprayed out in the interior of the chicken, with high losses of brine, or the chickens are pressed together so severely during the injection and are plastically deformed into a "flat chicken," that they can no longer be sold.

Furthermore, it is by no means possible to adapt the injection amount to the contour of the body, as in the case of poultry, for example, when using this device.

A method and a machine for injecting seasoning liquids into the meat of slaughtered animal bodies, particularly chicken, are described in DE 3209 730 A1, in which the animals are automatically brought to an injection station, hanging by their legs, along a defined transport path, whereby the seasoning liquid is introduced into the meat of the animals by means of a procedure coupled with the transport of the animals, as a function of the weight of the animals, in three different amounts of liquid, by means of an injection needle.

Aside from the injection amount that can be varied only in three stages, as a function of the weight of the chicken, another disadvantage of this solution is that a homogeneous distribution of the injection liquid is not possible, since the body shape is left out of consideration in the injection. The injection needle is always introduced only into the breast region. With this solution, it is not possible to perform injections into the legs or into the back region.

Furthermore, for example when the injection needle is pushed into the rib cage of the chicken, the injection needle can hit a bone. This negatively influences the distribution of the injection liquid, and can furthermore also result in pieces of bone that splinter off and remain in the meat.

As a result of the injection needles that are used as a necessary part of the process in the two aforementioned designs, clogging of the modules that carry the brine can occur, when sugar, proteins, and/or spices are used in the seasoning liquid, and this has a severely detrimental effect on the processing process.

Furthermore, narrow limits are necessarily imposed on the viscosity of the seasoning liquid to be processed, particularly as a result of the line lengths, which are determined by the process, since among other things, the wall friction increases so greatly with an increasing interior line pressure, at a high viscosity of the seasoning liquid, that the flow velocity can go down to zero under some circumstances.

Therefore it is not possible, using this needle injection described in the state of the prior art, to introduce seasoning liquids and/or brines into the pieces of meat with a uniform distribution, so that the formation of deposits always occurs in the piece of meat, at first, in which the brine is accumulated.

This pickling brine, which at first is only deposited in the meat, must then be distributed in the treated pieces of meat over a very long period of time, by means of massaging machines or jogging machines and/or rest phases.

Furthermore, the needles not only cause damage to the animal body, in each instance, but because they are repeatedly pushed into the subsequent animal, in each instance, they can also result in contamination.

Practical situations also show that the volume tolerance to be guaranteed, of the amount of liquid to be injected with needles, cannot be assured on an individual piece below 5% of the raw weight, since the channel caused in the piece of meat by needles has the effect that brine that has already been injected can exit again in undefined manner.

Furthermore, in the state of the art, a device for applying treatment liquid is described in WO 00/32051 A, in which seasoning liquid, for example, is sprayed onto the surface of the slaughtered animal bodies using high-pressure application on the one hand, or, on the other hand is injected with injection needles that are adjustable in their penetration depth, adapted to the anatomy of the slaughtered animal body. Furthermore, in the state of the art, devices are also known for needle-free injection of liquids into the meat from slaughtered animal bodies.

Thus, U.S. Pat. No. 3,436,230 describes a device for introducing liquids into cut pieces of meat, in which a rigid nozzle strip is pressed onto a piece of meat to be treated, for needle-free injection, by means of lifting and lowering it.

U.S. 5,176,071 A also describes a needle-free injection method for introducing liquids into cut meat from slaughtered animal bodies, whereby the injection takes place on a special continuous transport device, by means of a needle-free high-pressure injection, using a fixed nozzle strip. A contact pressure roller disposed above the nozzle strip and integrated into a special transport device brings about the direct contact of the nozzles with the meat that is absolutly required for the injection and, at the same time, presses the cut meat to an almost uniform thickness, so that despite the injection amount that is predetermined by the device (not continuously variable), an at least approximately uniform distribution of the brine concentration can be achieved.

As a result of the transport device that runs continuously during the injection and guarantees the contact pressure force against the nozzle strip, small lengthwise cuts are made in the pieces of meat, which result in continuous damage to the treated meat.

Aside from this disadvantage, continuously pressing the meat by means of the contact pressure roller can also result in contamination of the entire batch.

However, only pieces of meat that have been cut and are free of bones can be treated with the technical solution proposed in U.S. Pat. No. 5,176,071 A, since pieces of meat that contain bones are either not completely pressed onto the nozzle strip by the contact pressure roller, or can be squashed by the contact pressure roller, as in the case of poultry, for example, to such an extent that after the treatment, they can no longer be sold.

The solution presented in U.S. Pat. No. 6,014,926 A also describes a method and a device for needle-free high-pressure injection, whereby, in connection with a special transport device, the nozzles are pressed onto the pre-cut pieces of meat, by means of a pivoting robot arm, from above, during the injection, the transport device acting as a counter-bearing.

A disadvantage of this solution, again, is that with this solution, as well, the anatomy of pieces of meat from slaughtered animal bodies that contain bone, cartilage and/or a lot of connective tissue cannot be taken into consideration. All of the pieces of meat to be treated with the aforementioned solution must always be pre-processed and cut.

The processing of pieces of meat that contain bone, cartilage and/or a lot of connective tissue, for example, is not possible, in any case, using the solution presented in U.S. Pat. No. 6,014,926 A, since this solution results in a non-uniform, non-defined distribution of the liquid to be injected, in the meaty parts of the pieces of meat, under such general conditions.

Furthermore, the processing of slaughtered animal bodies is also not possible with the aforementioned solution, since it is not possible to determine the slaughtered weight or to vary the injection amount as a function of the slaughtered weight.

In addition, the nozzle plate to be pressed down by the robot arm would either be pressed down incompletely in the case of non-pre-cut meat or, as in the case of poultry, for example, the meat would be squashed in such a manner that after the treatment, it could no longer be sold, whereby the injection conditions that are necessarily predetermined by the nozzle plate would either result in a non-homogeneous distribution of the injection liquid, or would greatly contaminate the reflux, under such general conditions.

In DE-OS 198 25 233 C2, another method was presented, in connection with a related device, in which the liquid to be injected can be injected into the meat from slaughtered animal bodies, with one or more nozzles, as a full jet having a diameter of 0.2 mm to 1.0 mm, at a jet impact force of 0.5 N to 18 N, over a time period from 0.1 seconds to 0.8 seconds, either once or repeatedly, at one or more point-shaped locations on the surface, whereby massaging or jogging of the treated pieces of meat takes place before and/or between and/or after the injection process.

In this connection, the full jet of liquid injected according to DE-OS 198 25 233 penetrates into the meat in such a manner that because of its jet impact force, distribution in the tissue structure and therefore a large-volume spread in the form of a spread cloud takes place. Because of a continuous change of the position of the meat relative to the nozzle, which is caused by the device, a multi-dimensional injection at the most varied locations of the pieces of meat is furthermore carried out, resulting in a high degree of saturation of the meat, so that even larger amounts of brine can be injected using one or more of the nozzles described in DE-OS 198 25 233, in partial amounts, in each instance.

This solution is excellently suited for use in connection with the production of boiled ham, for example.

A disadvantage of this solution described in DE-OS 198 25 233 C2, however, is that a regional accumulation of brine can take place in the piece of meat to be processed, according to the rules of statistical distribution.

In this connection, the pieces of meat to be treated in the device previously described in DE-OS 198 25 233 C2, are massaged or jogged optionally before but always after the injection according to the invention, until the amount of liquid previously calculated for the amount of meat is contained in the meat with a statistical distribution.

No consideration of the anatomy of the slaughtered animal body, for example of a chicken, can be taken with this solution.

Also, in the case of processing chickens, for example, using the aforementioned solution, a relative movement takes place between the animal and the nozzle during the injection, which results in severe damage to the surface of the meat, as a result of the clearly lower specific weight.

The machine structure also allows only a discontinuous process, and no continuous injection as in the case of a transport belt, for example.

The invention is therefore based on the task of developing a device and a method for introducing liquids into meat, which eliminates the aforementioned disadvantages of the state of the art and makes it possible to introduce, even simultaneously introduce water, brines, stabilizers, seasoning liquids and/or other liquids even into meat that contains bones and/or cartilage or connective tissue, such as into slaughtered animal bodies of poultry, for example, but also into legs and belly meat, in highly effective manner, with a robust structure, at great reliability, within a very short period of time, on almost any existing transport device, even on a slaughtering conveyor belt, in needle-free manner, adapted to the anatomy of the slaughtered animal body, in precisely defined, even very small amounts, at a minimized injection amount tolerance.

According to the invention, this task is accomplished by means of a method for introducing liquids into meat, according to claim 9, in connection with a device according to the invention, for introducing liquid into meat, according to claim 1, which is disposed on a base frame.

The device can work together with an existing transport device (2) for meat from slaughtered animal bodies (12) that contains bones and/or cartilage or connective tissue, which is independent of the device according to the invention.

One or more machine frame(s) (3) on which an injection device (6) for needle-free injection is disposed, is/are attached to the base frame (1) of the device.

It is essential to the invention that the injection device (6) consists of several nozzle pipes (7), which are arranged on the machine frame (3), are adapted to the anatomy of the meat part, and can be lead up to an end position limiter (9), one or several spray nozzles being arranged on the nozzle pipes and surrounding the meat piece during the injection in a clamp-like manner.

A prerequisite for the use of the simplest embodiment of the solution according to the invention, with (a) machine frame(s) rigidly disposed on the base frame (1), is that the transport device (2) is cycled, i.e. stops during the injection process.

However, it is also advantageous that the machine frame(s) (3) are disposed on the base frame (1) in movable manner.

By means of the use of one or more movable machine frame(s) (3), it is possible to control their drive, in accordance with the state of the art, in such a manner that the frame(s) move synchronously with the transport device (2), part of the time. Therefore, the relative velocity that is essential to the invention can always be maintained between the transport belt and the injection device (6) that is in use, during the injection. By means of the use of several such machine frames (3) that are synchronously movable with the transport device (2), the device according to the invention can be adapted to any desired speed of the transport device (2). It is also advantageous that the nozzle pipes (7) with the specially oriented spray nozzles (8) disposed on them are precisely adapted to the anatomy, in each instance, for example legs of meat, poultry, etc., and thereby result in a defined "stop".

The device according to the invention also makes it possible, by means of the use of several liquid distributor systems (5) that can be used according to the invention, to introduce both low-viscosity and high-viscosity brines into the meat that contains bones and is to be processed, in defined manner.

As a result of the three-dimensional arrangement of the spray nozzles (8) according to the invention, each point of the surface of the slaughtered animal body can furthermore itself be approached with different injection fluids, in defined manner, so that in the case of a chicken, for example, a lower-salt brine is injected more deeply in the region of the legs, and a higher-salt brine is injected not as deeply in the region of the back, whereby not only salt brines at different concentrations but also seasoning liquids, such as ketchup or mayonnaise, can simultaneously be introduced into the meat of the slaughtered animal bodies that contains bones, at a volume tolerance of the total amount of liquid injected into an individual piece of approximately 2% of the raw weight.

It is essential that the transport device is a transport belt or a slaughtering conveyor belt. The placement of the device according to the invention on a slaughtering conveyor belt has the advantage, as compared with the placement in a transport belt, that the treatment can take place at the earliest possible point in time post mortem, on the one hand, and that no additional logistics are required in the technological sequence of steps, on the other hand, so that the original process speed can immediately be utilized for the further processing and preservation of the freshly slaughtered meat that contains bones, whereby a significant savings in working time is achieved as compared with the placement of the device according to the invention on a transport belt.

On a transport belt, in contrast, the pieces of meat that contain bones and are to be processed must first be positioned, in a separate work step.

It is furthermore characteristic that the injection device (6) is provided with end position limiters (9), so that squashing of the poultry body, for example, is avoided.

It is another essential characteristic of the invention that similar and/or different spray nozzles (8) are disposed on a nozzle pipe (7). In this way, the injection depth, on the one hand, but also the injection amount can be varied and/or adapted to different viscosities of the injection liquid, while the injection time remains the same, for example.

It is also in accordance with the invention that several injection devices (4) are rigidly connected with one another on a movable machine frame (3). In this way, the speed of the transport device can be increased, for example, while the number of movable machine frames (3) remains the same, and thus the throughput of the entire system can be increased.

It is furthermore characteristic that several movable machine frames (3) having injection devices (4) are disposed on a base frame (1). This solution according to the invention particularly allows an increase in the reliability of the entire system, while simultaneously optimizing the production costs, since the masses to be accelerated in the recovery movement of the machine frames (3) can be optimized, particularly at high speeds of the transport device (2).

It is furthermore essential to the invention that each injection device (6) can be provided with one or more movably disposed injection lance(s) (10), which move(s) into the abdominal cavity of the animal in connection with the processing of poultry. This/these special injection lance(s) (10) serve(s) to disinfect or season the abdominal cavity of the animal.

The pieces of meat are transported in the transport device (2) hanging vertically, set up vertically, set up horizontally, or placed into a matrix, so that a precise fixation of position relative to the injection device(s) (6) is always guaranteed. The method according to the invention is characterized in that each of the nozzle pipes (7) can have same-type or different liquids applied to them separately, over the same and/or different precisely defined periods of time, at the same and/or different precisely defined pressure. This makes it possible to optimally inject injection liquids, even different ones, in different injection amounts, calculated in advance on the basis of the amount of active substance for the piece of meat that contains bones, for example, as a result of controlling the injection time and injection pressure by means of the device according to the invention, in precise, reproducible, and reliable manner.

However, the method according to the invention is also characterized in that if needed, the injection lance(s) (6) is/are impacted with the same or different precisely defined pressure, over the same or different precisely defined periods of time, so that in the case of poultry processing, similar/different liquids (even in different amounts) can be optimally sprayed in the abdominal cavity of the animal, precisely, reproducibly, in order to disinfect and/or season the abdominal cavity of the animal in defined manner.

It is also essential that specific, recurring food geometries such as legs of meat, poultry, etc., can be processed highly effectively and in targeted manner, by means of the nozzle pipes (7) that are precisely adapted to the anatomy, in each instance, with the specially oriented spray nozzles (8) that are disposed on them, on the basis of a jet impact force that is precisely coordinated with the liquid to be injected and the penetration depth to be achieved, and an injection time that is coordinated with the injection depth, in this connection, taking the nozzle size into consideration, so that disinfecting and/or seasoning that is adapted to the anatomy of the piece of meat that contains bones, in each instance, can be guaranteed at a high and particularly uniform product quality, with a minimal injection amount tolerance.

By means of the simultaneous control of several nozzle pipes at different operating pressure and with different injection fluids, which is possible according to the invention, gentle processing, with optimal utilization of the tissue structure and bone structure, in each instance, coordinated with the slaughtered animal body to be processed, in each instance, can be guaranteed in connection with the use of different spray nozzles on a nozzle pipe that is possible according to the invention.

This reliable, highly effective, precisely reproducible injection of the meat that contains bones is the basis for a high and uniform product quality, whereby the loss of liquid that occurs during the cooling of fresh meat, for example, can actually be equalized in defined manner.

It is also characteristic that several movable machine frames (3) having injection devices (6) are used with a time offset, as a function of the speed of the transport device, in each instance.

It is also in accordance with the invention that the pieces of meat are weighed before the needle-free injection, in order to always guarantee a precise injection amount with reference to the raw weight.

However, it is always characteristic that the machine frames (3) with the injection devices (6) that are in the injection phase have the relative velocity "0" relative to the transport belt (2). In this way, damage to the slaughtered animal body that contains bones is avoided.

It is also essential to the invention that the viscosity of the liquid to be processed is between 1 mPas and 10,000 mPas. By means of the method according to the invention, it is also possible, for example, to inject minerals, acidic, basic, aromatic substances, carbohydrates, fats, proteins, and additives such as seasonings, as well as mixtures of the above substance, mixed into liquids, whereby the chemical and mechanical state of the food is influenced in such a manner that it is stabilized against bacteriological infection and/or bacteriological growth.

Furthermore, the injection of the highly viscous liquids can also serve to hold or achieve aromas, to hold tissue fluids, and/or to hold foreign fluids etc., and thus to implement stabilization of the liquid in the final status of the end product desired by producers.

Also, food-grade additives can be injected into chickens to be frozen, for example, which restrict the crystal growth of water, and thereby counteract a destruction of the muscle fibers that results from that.

In this connection, the device according to the invention makes it possible for both low-viscosity and high-viscosity brines to be simultaneously introduced into the meat that contains bones and is to be processed, in needle-free manner, highly effectively, reliably, and in defined manner, at the different locations of the surface.

In connection with the almost all-around arrangement of the spray nozzles (8) with reference to the piece of meat that contains bones and is to be processed, which is also in accordance with the invention, the result is achieved that the pieces of meat that contain bones and are transported in the transport direction (2) are optimally saturated, uniformly over the entire volume, for example in the form of clouds (which can overlap one another).

Another characteristic of the invention consists in the fact that the temperature of the liquid to be processed lies between −5° C. and 150° C., so that on the one hand, even high hygiene requirements in the low temperature range can be met by means of the solution according to the invention. On the other hand, even fats can be injected in the liquid state, by means of the solution according to the invention.

Other characteristics, details, and advantages of the invention are furthermore evident from the following explanations concerning the exemplary embodiments, in connection with the related drawings, along with the text of the claims.

In the following, the invention will now be explained using several exemplary embodiments, in connection with six figures.

Figure 2:
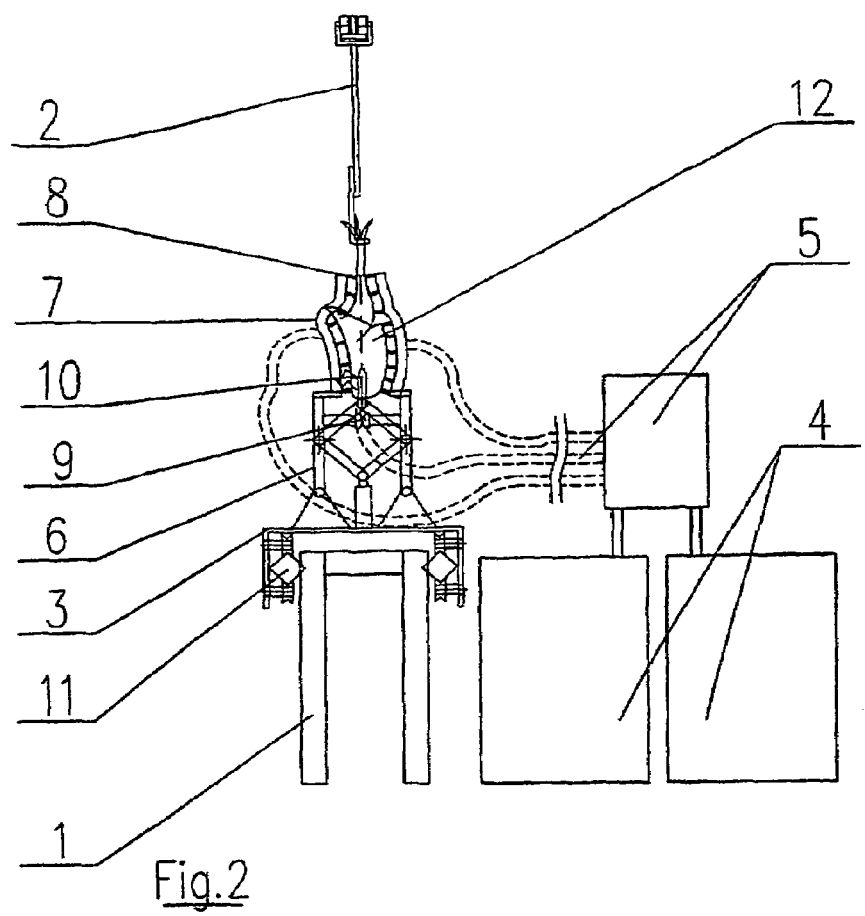
Figure 3:
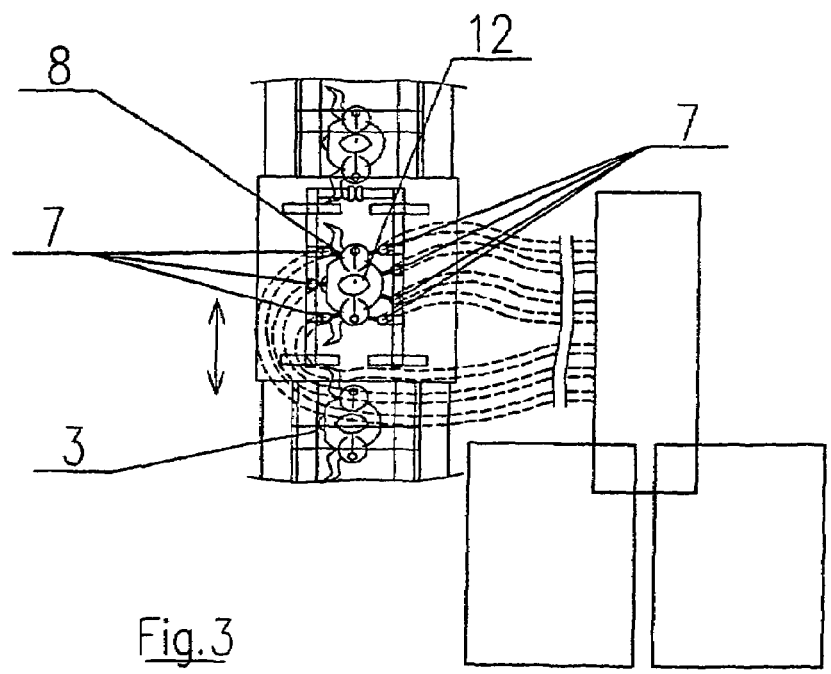
Figure 4:
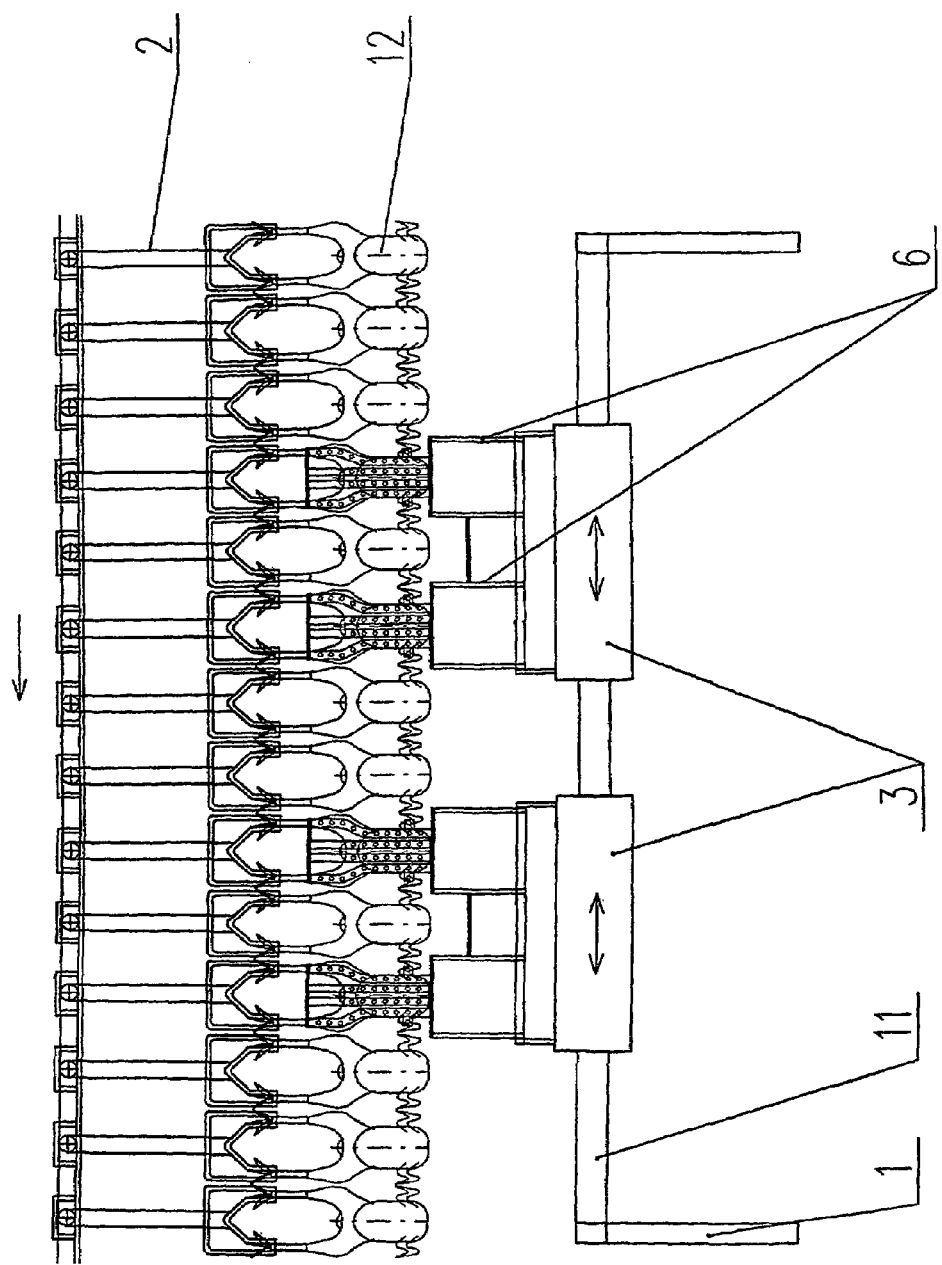
Figure 5:
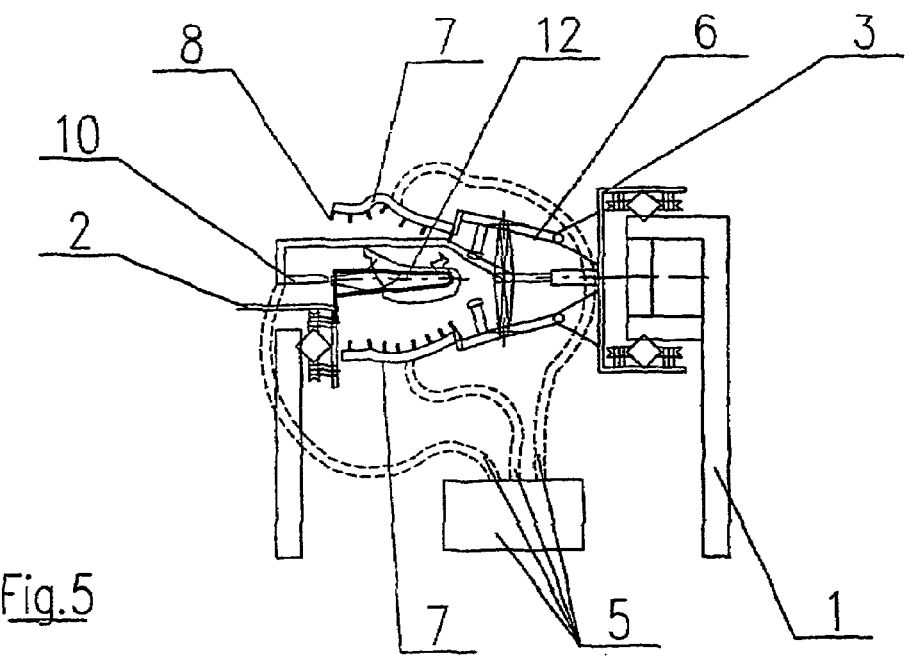
Figure 6:
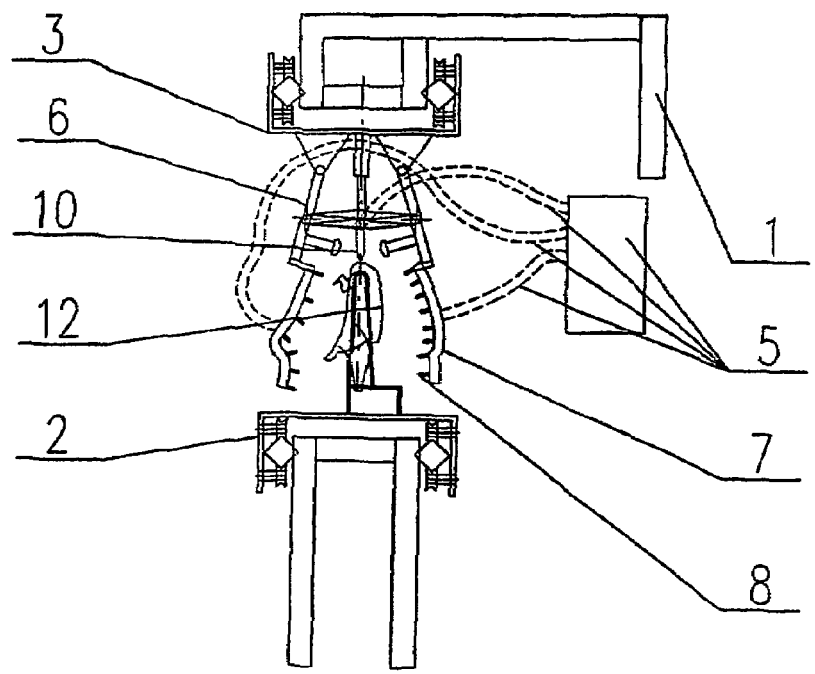

These show:

FIG. 1: a front view of a possible construction of the device according to the invention, directly on a slaughtering conveyor belt, with the injection device being open;

FIG. 2: a front view of the device according to the invention, according to FIG. 1, with the injection device being closed;

FIG. 3: a top view of the device according to the invention, according to FIG. 2, with the injection device being closed;

FIG. 4: the device according to the invention, according to FIG. 1, in a side view;

FIG. 5: a front view of another possible construction of the device according to the invention, with a slaughtered animal body that contains bones, cartilage, and connective tissue, set horizontally onto an accommodation, with the injection device being open;

FIG. 6: a front view of another possible construction of the device according to the invention, with a slaughtered animal body that contains bones, cartilage, and connective tissue, set vertically onto an accommodation, with the injection device being open.

FIG. 1 shows a front view of a possible construction of the device according to the invention, on a slaughtering conveyor belt, with the injection device 6 being open.

The meat from slaughtered animal bodies 12, for example poultry, is disposed on a transport device 2, in the present case a slaughtering conveyor belt.

Below the slaughtering conveyor belt, there is the base frame 1 of the device according to the invention.

On this frame, two machine frames 3 that can be moved on linear guides 11 are disposed like "sleds."

On each of the movable machine frames 3, in turn, two injection devices 6, in each instance, for needle-free injection are attached, fixed in place, connected with several high-pressure systems 4 by way of several liquid distributor systems 5.

Each of the injection devices 6 consists of seven nozzle pipes 7 that are disposed to pivot on the machine frame 3, on which pipes several spray nozzles 8 are disposed, in each instance.

The nozzle pipes 7 with the spray nozzles 8 specially oriented and disposed on them are precisely adapted to the anatomy of the poultry slaughtered animal bodies to be processed.

These nozzle pipes 7, which are disposed on the machine frame so as to pivot, and precisely adapted to the anatomy of the slaughtered animal body to be processed, are connected with one another by means of a drive, in such a manner that the injection device 6, which consists of nozzle pipes 7 with a drive, as shown in FIG. 1, opens before or after the injection, respectively, and does not touch the slaughtered animal body 12. During the injection, as shown in FIGS. 2 and 3, the nozzle pipes 7 of the injection device 6 surround the slaughtered animal body 12 in the manner of tongs.

In this connection, the injection device 6 is provided with end position limiters 9, in order to prevent squashing of the poultry bodies.

FIG. 2 now shows a front view of the device according to the invention, according to FIG. 1, but with the injection device 6 being closed, and with spray nozzles 8 pressed against the slaughtered animal body 12. Each injection device 6, in the present exemplary embodiment, is provided with an injection lance 10 that is disposed so as to be vertically movable. This injection lance (10) serves to disinfect and/or season the abdominal cavity of the slaughtered animal body 12, and moves into the abdominal cavity of the slaughtered animal body (12) while the spray nozzles 8 are pressed on.

The machine frames 3 that are disposed on the base frame on linear guides 11, to be movable like "sleds," are moved by way of their drive, in such a manner that synchronous running of the machine frame 3, which is in the spray cycle, with the transport device 2, part of the time, is guaranteed during the injection.

After the injection, the nozzle pipes 7 that surround the slaughtered animal body 12 like tongs release the slaughtered animal body 12, and the machine frame 3 moves counter to the transport direction of the slaughtering conveyor belt, for a renewed positioning for the next injection procedure.

In this connection, the placement of the device according to the invention on a slaughtering conveyor belt has the advantage, as compared with the placement on a transport belt, that the treatment can take place at the earliest possible point in time post mortem, on the one hand, and on the other hand, no additional logistics in the technological sequence of steps is necessary, so that the original process speed can immediately be utilized for the further processing and preservation of the freshly slaughtered meat that contains bones.

FIG. 3 shows a top view of the device according to the invention according to FIG. 2, with seven nozzle pipes 7 disposed on the machine frame 3. On each of these nozzle pipes 7, both similar and different spray nozzles 8 can be disposed, in this connection.

As a result, the injection depth, on the one hand, but also the injection amount can be varied and/or adapted to different viscosities of the injection liquid, with the injection time remaining the same, for example.

By means of the simultaneous use of several fluid distributor systems 5, the device according to the invention makes it possible to simultaneously introduce both low-viscosity and high-viscosity brines into the meat that contains bones and is to be processed, in defined manner.

As a result of the spatial arrangement of the spray nozzles 8, every selected point of the surface of the slaughtered animal body 12 can be approached in defined manner, even with different injection liquids, so that a volume tolerance of the injected amount of liquid for an individual piece, at approximately 2% of the raw weight, can be guaranteed.

In FIG. 4, the device according to the invention according to FIG. 1 is shown in a side view.

The base frame 1 of the device according to the invention is disposed on the slaughtering conveyor belt, a possible embodiment of the transport device 2; two machine frames 3 are disposed to move on linear guides 11, on the base frame.

Again, two injection devices 6 for needle-free injection, connected with several high-pressure systems by way of several liquid distributor systems, are disposed on each of the two movable machine frames 3.

By means of the use of several machine frames 3, preferably having several injection devices 6, which frames can be moved synchronously and simultaneously with the transport device 2, part of the time, the device according to the invention can also be adapted to higher speeds of the slaughtering conveyor belt, the transport device 2, so that during the injection, the relative velocity "0" is always guaranteed between the slaughtering conveyor belt and the injection device 6 that is in use.

FIG. 5 now shows a front view of another possible construction of the device according to the invention, with a slaughtered animal body that contains bones, cartilage, and connective tissue, set horizontally onto an accommodation of a transport device 2, with the injection device being open.

Again, the base frame 1 of the device according to the invention is disposed on the transport device 2 with several movable machine frames 3 (as already described in connection with FIGS. 1 to 4).

In this exemplary embodiment, as well, an injection lance 10 and the injection devices 6 according to the invention are disposed on these movable machine frames 3, with the supply lines for the liquid distributor systems 5, for needle-free injection.

In the present exemplary embodiment, each injection device 6 again consists of several nozzle pipes 7 provided with spray nozzles 8, which can pivot but are disposed horizontally on the machine frame 3.

By means of the arrangement of the slaughtered animal bodies 12 horizontally on the accommodation of a transport device 2, a precise fixation of position of the slaughtered animal bodies 12 relative to the injection devices 6 is guaranteed.

This device according to the invention also makes it possible, by means of the use of several liquid distributor systems 6, once again, to simultaneously introduce both low-viscosity and high-viscosity brines into the meat that contains bones and is to be processed, in defined manner.

FIG. 6 shows a front view of another possible construction of the device according to the invention, with a slaughtered animal body 12 that contains bones, cartilage, and connective tissue, set vertically onto an accommodation of a transport device 2, with the injection device 6 being open.

Again, the base frame 1 of the device according to the invention is disposed on the transport device 2 with several movable machine frames 3 (as described in connection with FIGS. 1 to 4).

In this exemplary embodiment, the injection devices 6 for needle free injection are disposed on the movable machine frames "hanging" vertically. Each of the injection devices 6 consists of several nozzle pipes 7 that are disposed to pivot vertically on the machine frame 3, and again, several spray nozzles 8 are disposed on the pipes. In this embodiment, too, an injection lance 10 is disposed on the injection device.

Again, by means of the placement of the slaughtered animal bodies 12 vertically on an accommodation of a transport device 2, a precise fixation of the position of the pieces of meat that contain bones and are to be processed, relative to the injection devices 6, is guaranteed.

In connection with the use of several machine frames 3, preferably having several injection devices 6, that can be synchronously moved simultaneously with the transport device 2, part of the time, this embodiment of the device according to the invention can also be adapted to every speed of a continuously operating transport device 2, so that the relative velocity "0" is always guaranteed between the transport device 2 and the injection device 6, during the injection.

This device according to the invention also makes it possible, by means of the use of several liquid distributor systems 5, to simultaneously introduce both low-viscosity and high-viscosity liquids into the meat that contains bones, cartilage, and connective tissue, in defined manner.

On the basis of the present solution according to the invention, it has therefore been possible to develop a device and a method for introducing liquid into meat, which makes it possible to introduce, even simultaneously introduce water, brines, stabilizers, seasoning liquids and/or other liquids even into meat that contains bones and/or cartilage or connective tissue, such as into slaughtered animal bodies of poultry, for example, but also into legs and belly meat, in highly effective manner, with a robust structure, at great reliability, within a very short period of time, on almost any existing transport device, even on a slaughtering conveyor belt, in needle-free manner, adapted to the anatomy of the slaughtered animal body, in precisely defined, even very small amounts, at a minimized injection amount tolerance.

The invention claimed is:

1. A device for introducing liquids into a piece of meat having a particular anatomy comprising:
    (a) a base frame;
    (b) at least one machine frame disposed on said base frame for cooperation with a transport device;
    (c) an injection device for needle-free injection comprising a plurality of nozzle pipes disposed on said at least one machine frame, an end position limiter, and a feed line movable up to said end position limiter, said nozzle pipes being adapted to the anatomy of the piece of meat and surrounding the piece of meat like tongs during the injection;
    (d) a high-pressure system;
    (e) a liquid distributor system connecting said injection device with said high-pressure system; and
    (f) a plurality of spray nozzles disposed on said nozzle pipes;
    wherein each nozzle pipe is separately impacted with similar or different liquids over identical or different precisely defined periods of time with an identical or different precisely defined pressure.

2. The device according to claim 1, wherein the transport device is a transport belt or a slaughtering conveyor belt.

3. The device according to claim 1, wherein several injection devices for needle-free injection are disposed on the at least one machine frame and are connected with several high-pressure systems by way of several liquid distributor systems.

4. The device according to claim 1, wherein similar or different spray nozzles are disposed on a nozzle pipe.

5. The device according to claim 1, wherein several injection devices are rigidly connected with one another on a movable machine frame.

6. The device according to claim 1, wherein several movable machine frames having injection devices are disposed on a base frame.

7. The device according to claim 1, wherein, the injection device is provided with at least one movably disposed injection lance movable into an abdominal cavity of the piece of meat.

8. The device according to claim 1, wherein the piece of meat is transported in the transport device hanging vertically, set up vertically, set up horizontally, or placed into a matrix.

9. A method for introducing liquids into meat comprising;
    (a) providing a device comprising a base frame, at least one machine frame disposed on the base frame for cooperation with a transport device, an injection device for needle-free injection comprising a pluraltiy of nozzle pipes disposed on the at least one machine frame, an end position limiter, and a feed line movable up to the end position limiter, the nozzle pipes being adapted to the anatomy of the piece of meat and surrounding the piece of meat like tongs during the injection, a high-pressure system, a liquid distributor system connecting the injection device with the high-pressure system, and a plurality of spray nozzles disposed on the nozzle pipes; and
    (b) using the device to introduce the liquids into the meat;
    wherein each nozzle pipe is separately impacted with similar or different liquids over identical or different precisely defined periods of time with an identical or different precisely defined pressure.

10. The method according to claim 9, wherein the injection device further comprises a plurality of movably disposed injection lances and the injection lances are also separately impacted with liquids over identical or different precisely defined periods of time, with identical or different precisely defined pressure.

11. Method The method according to claim 9, wherein several movable machine frames having injection devices are utilized with a time offset.

12. Method The method according to claim 9, wherein the meat is weighed before the needle-free injection.

13. The method according to claim 9, wherein the device has a plurality of machine frames and a plurality of injection devices and the machine frames with the injection devices that are in an injection phase have a relative velocity "0" relative to the transport belt.

14. The method according to claim 9, wherein the liquids have a viscosity between 1 mPas and 10,000 mPas.

15. The method according to claim 9, wherein the liquids have a temperature between −5° C. and 150° C.

* * * * *